United States Patent
Goto et al.

(10) Patent No.: US 10,148,583 B2
(45) Date of Patent: Dec. 4, 2018

(54) TRANSFER DEVICE

(71) Applicant: MITSUBISHI ELECTRIC CORPORATION, Tokyo (JP)

(72) Inventors: Yuji Goto, Tokyo (JP); Ryusuke Kawate, Tokyo (JP); Sachiko Taniguchi, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 15/541,047

(22) PCT Filed: Feb. 23, 2015

(86) PCT No.: PCT/JP2015/055056
§ 371 (c)(1),
(2) Date: Jun. 30, 2017

(87) PCT Pub. No.: WO2016/135829
PCT Pub. Date: Sep. 1, 2016

(65) Prior Publication Data
US 2017/0373978 A1 Dec. 28, 2017

(51) Int. Cl.
*H04L 12/851* (2013.01)
*H04L 12/703* (2013.01)
(Continued)

(52) U.S. Cl.
CPC .............. *H04L 47/24* (2013.01); *H04L 45/28* (2013.01); *H04L 12/4641* (2013.01); *H04L 45/24* (2013.01); *H04L 69/28* (2013.01)

(58) Field of Classification Search
CPC .......... H04L 47/24; H04L 45/24; H04L 45/28
See application file for complete search history.

(56) References Cited

U.S. PATENT DOCUMENTS

2004/0037257 A1 2/2004 Ngo
2004/0258056 A1* 12/2004 Ishihara .............. H04L 12/4633
370/386
(Continued)

FOREIGN PATENT DOCUMENTS

CN 103501275 A 1/2014
EP 2 568 673 A1 3/2013
(Continued)

OTHER PUBLICATIONS

Chinese Office Action dated Jan. 24, 2018 in the corresponding Chinese Application No. 201580076606.6 with an English Translation.
(Continued)

*Primary Examiner* — Albert T Chou
(74) *Attorney, Agent, or Firm* — Birch, Stewart, Kolasch & Birch, LLP

(57) ABSTRACT

There are provided: a transfer management table storage unit to store a transfer management table which indicates transfer destination ports for frames received from another transfer device, the another transfer device being configured to transmit a frame low in importance of received frames without copying this frame and to transmit an important frame of received frames to paths made redundant by copying the important frame, the important frame being a frame higher in importance than the frame low in importance; an adjacent information table storage unit to store an adjacent information table which indicates information about instruments connected to the ports; and a transfer destination management unit to control whether to transfer an important frame received from another transfer device by use of the transfer management table and the adjacent information table.

5 Claims, 8 Drawing Sheets

(51) Int. Cl.
  *H04L 12/46* (2006.01)
  *H04L 12/707* (2013.01)
  *H04L 29/06* (2006.01)

(56) References Cited

U.S. PATENT DOCUMENTS

| | | | |
|---|---|---|---|
| 2008/0279181 A1 | 11/2008 | Shake et al. | |
| 2011/0134748 A1* | 6/2011 | Spatscheck | H04L 1/0041 370/216 |
| 2014/0082232 A1* | 3/2014 | Sugawara | G06F 12/00 710/38 |
| 2015/0341435 A1* | 11/2015 | Hamada | H04L 67/1078 709/205 |
| 2017/0041243 A1* | 2/2017 | Nakayasu | H04L 12/4625 |

FOREIGN PATENT DOCUMENTS

| | | |
|---|---|---|
| JP | 4074304 B2 | 4/2008 |
| JP | 4633723 B2 | 2/2011 |
| JP | 2011-176424 A | 9/2011 |
| JP | 2012-248914 A | 12/2012 |
| JP | 2015-23566 A | 2/2015 |
| WO | WO 2006/001060 A1 | 1/2006 |
| WO | WO 2007/079280 A2 | 7/2007 |

OTHER PUBLICATIONS

Extended European Search Report dated Jan. 11, 2018 issued in corresponding European Application No. 15883127.1.
IEEE Standards Association, "IEEE Standard for Local and metropolitan area networks—Media Access Control (MAC) Bridges and Virtual Bridges Local Area Networks—Amendment 20: Shortest Path Bridging", IEEE Computer Society, IEEE Std 802.1aqTM—2012, New York, NY, Jun. 29, 2012, 340 pgs.
Office Action dated Jun. 22, 2018 in corresponding Chinese Patent Application No. 201580076606.6 with a Machine Translation.

* cited by examiner

FIG.3

| HASH VALUE DETERMINED FROM SPB MANAGEMENT VID AND DESTINATION ADDRESS | TRANSFER DESTINATION PORT INFORMATION | | | |
|---|---|---|---|---|
| | PORT 1 | PORT 2 | ... | PORT N |
| 1 | 1 | 1 | ... | 1 |
| 2 | 1 | 1 | ... | 0 |
| ⋮ | ⋮ | ⋮ | ⋮ | ⋮ |
| M | 1 | 1 | ... | 1 |

FIG.4

| CONNECTION DESTINATION INFORMATION | | | |
|---|---|---|---|
| PORT 1 | PORT 2 | ... | PORT N |
| TRANSFER DEVICE THAT FORMS SPB | SUBORDINATE INSTRUMENT | ... | TRANSFER DEVICE THAT FORMS SPB |

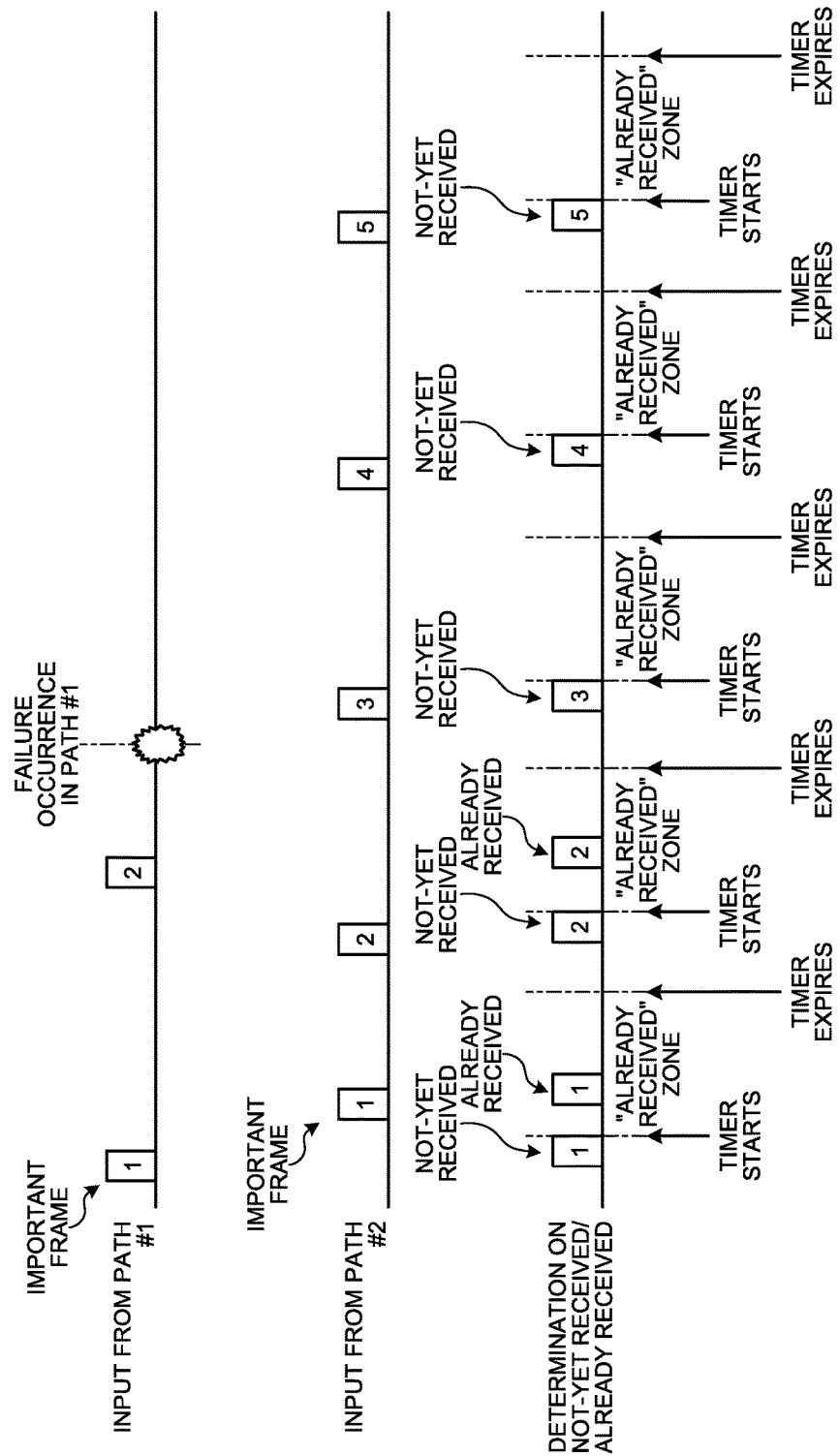

TRANSFER DEVICE

FIELD

The present invention relates to a transfer device that transfers frames through paths made redundant.

BACKGROUND

Conventionally, as regards a network in which a plurality of independent paths are set between a transmission side transfer device and a reception side transfer device, studies have been conducted on a scheme for enhancing its reliability. The transmission side transfer device specifies a frame that requires reliability enhancement (which will be referred to as "important frame") with reference to information in the frame header. Then, the transmission side transfer device inserts identifiers, such as transmission source identification information, path information, and/or order information, into the important frame, and performs broadcast transmission to all the independent paths. The reception side transfer device specifies an important frame from frames received from the independent paths. The reception side transfer device identifies an important frame having the same information based on a frame identifier, and then selects whether to perform transfer or discard. As a result, even if a failure occurs at one of the paths and thereby disconnects frames, an important frame can be communicated without causing instantaneous interruption, by use of another of the paths if it remains. Such a technique is disclosed in Patent Literature 1 listed below.

According to SPB (Shortest Path Bridging), all the transfer devices involved therein recognize the connection configuration and the instruments respectively connected to the transfer devices, whereby a shortest path tree (Shortest Path Tree) using VLAN-ID (Virtual Local Area Network-IDentify), (which will be referred to as "VID", hereinafter), is configured by use of a path control technique called "IS-IS" (Intermediate System to Intermediate System). A transmission side transfer device transmits a frame, after performing thereto an encapsulation process, which contains a path and destination information. A reception side transfer device serving as the destination performs transfer to a subordinate instrument, by outputting a frame after performing thereto a decapsulation process. As a result, also in a mesh network, frames can be transferred between transfer devices through the shortest path and at the minimum cost. Such a technique is disclosed in Non Patent Literature 1 listed below.

CITATION LIST

Patent Literature

Patent Literature 1: Japanese Patent No. 4074304

Non Patent Literature

Non Patent Literature 1: IEEE802.1aq, Shortest Path Bridging, 2012

SUMMARY

Technical Problem

However, in Patent Literature 1, the reception side transfer device corresponds only to one output port. Thus, in the case of a mesh network using SPB, there is a problem in that frame transfer cannot be controlled in accordance with a transfer destination instrument, and unnecessary frame transfer is performed as the case may be.

The present invention has been made in view of the above, and an object of the present invention is to provide a transfer device that can control frame transfer in accordance with a transfer destination instrument.

Solution to Problem

In order to solve the above problems and achieve the object, according to an aspect of the present invention, there is provided a transfer device including a transfer management table storage unit to store a transfer management table which indicates transfer destination ports for frames received from another transfer device, the another transfer device being configured to transmit a frame low in importance of received frames without copying this frame and to transmit an important frame of received frames to paths made redundant by copying the important frame, the important frame being a frame higher in importance than the frame low in importance. The transfer device further includes an adjacent information table storage unit to store an adjacent information table which indicates information about instruments connected to the ports. The transfer device further includes a transfer destination management unit to control whether to transfer an important frame received from another transfer device by use of the transfer management table and the adjacent information table.

Advantageous Effects of Invention

The transfer device according to the present invention has an effect capable of controlling frame transfer in accordance with a transfer destination instrument.

BRIEF DESCRIPTION OF DRAWINGS

FIG. 3 is a view illustrating a configuration example of a transfer management table according to the first embodiment.

FIG. 4 is a view illustrating a configuration example of an adjacent information table according to the first embodiment.

FIG. 9 is a view illustrating a process example for determining whether a frame received by a frame selection unit is a not-yet received frame or already received frame, according to the second embodiment.

DESCRIPTION OF EMBODIMENTS

Exemplary embodiments of a transfer device according to the present invention will be explained below in detail with reference to the accompanying drawings. The present invention is not limited to the following embodiments.

First Embodiment

Figure 1:
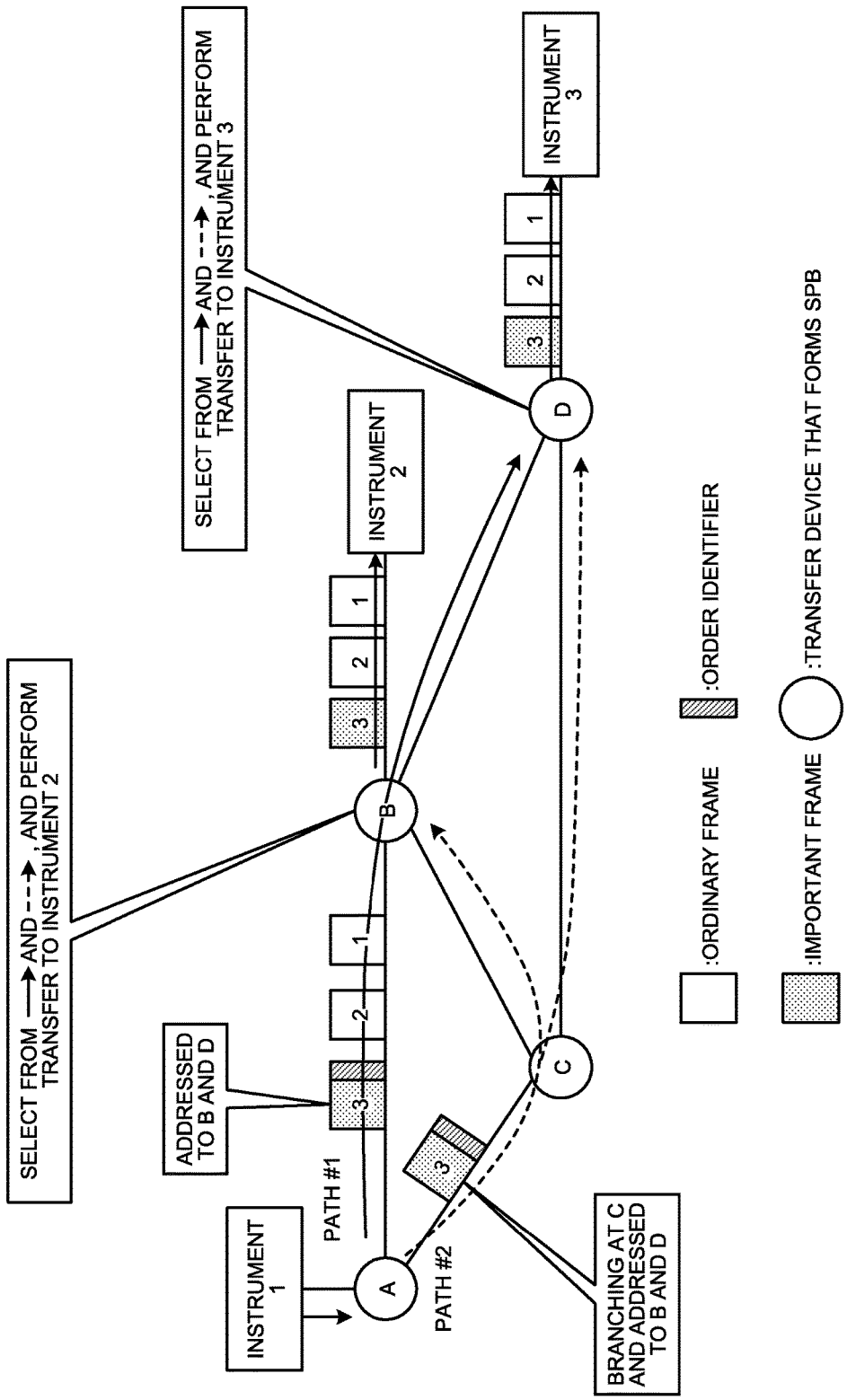
FIG. 1 is a view illustrating a configuration example of a network system according to a first embodiment.

FIG. 1 is a view illustrating a configuration example of a network system according to a first embodiment of the present invention. In the network system, four transfer devices A, B, C, and D that form SPB are connected in the form of a mesh. Specifically, the transfer device A is connected to the transfer devices B and C, the transfer device B is connected to the transfer devices A, C, and D, the transfer device C is connected to the transfer devices A, B, and D, and the transfer device D is connected to the transfer devices B and C. A path #1 is composed of a route that forms SPB and extends from the transfer device A to the transfer devices B and D. A path #2 is composed of a part that forms SPB and extends from the transfer device A to the transfer device C, and two routes that extend to the transfer devices B and D by branching at the transfer device C. Specifically, an explanation will be given of an assumed case where an instrument 1 transmits frames to instruments 2 and 3. In FIG. 1, an important frame means a frame higher in importance than the ordinary frames each being a frame lower in importance.

The transfer device A identifies an important frame received from the instrument 1. With respect to an important frame, the transfer device A copies it onto two paths. The transfer device A inserts an order identifier, such as a sequence number indicating a frame transmission order, into the copied important frame. Then, the transfer device A transmits each important frame, after performing thereto an encapsulation process of SPB where information about each path is contained. With respect to an ordinary frame, the transfer device A does not copy it, but transmits it from one path, i.e., one of the path #1 and the path #2.

When the transfer device B receives a not-yet received important frame from the path #1, the transfer device B transfers it to the instrument 2 and to the transfer device D. Upon receiving an already received important frame from the path #1, the transfer device B transfers it only to the transfer device D. Further, when the transfer device B receives a not-yet received important frame from the path #2, the transfer device B transfers it to the instrument 2. Upon receiving an already received important frame from the path #2, the transfer device B discards it.

The not-yet received frame means a frame, among the frames copied by the transmission side transfer device, which is received at first while the same frame has not yet been received by the reception side transfer device, or it means a frame transmitted without being copied by the transmission side transfer device, and received by the reception side transfer device. Further, the already received frame means a frame, among the frames copied by the transmission side transfer device, which is received afterward while the same frame has already been received by the reception side transfer device.

The transfer device C copies an important frame received from the path #2, and transfers it to the transfer devices B and D.

When the transfer device D receives a not-yet received important frame from the path #1, the transfer device D transfers it to the instrument 3. Upon receiving an already received important frame from the path #1, the transfer device D discards it. Further, when the transfer device D receives a not-yet received important frame from the path #2, the transfer device D transfers it to the instrument 3. Upon receiving an already received important frame from the path #2, the transfer device D discards it.

Of the received frames, each transfer device transmits an ordinary frame lower in importance without copying it, but transmits an important frame to the paths made redundant, by copying it. In the network system illustrated in FIG. 1, a plurality of independent paths are set by SPB between communication devices, such as layer-2 switches. Further, when the reception side transfer device is to transfer an important frame to a transfer device or to transfer it to an instrument different in attribute, even if a failure has occurred at one of the independent paths and thereby disconnected an important frame, the reception side transfer device can transfer the important frame without causing a loss therein, by use of another of the paths if it remains.

Figure 2:
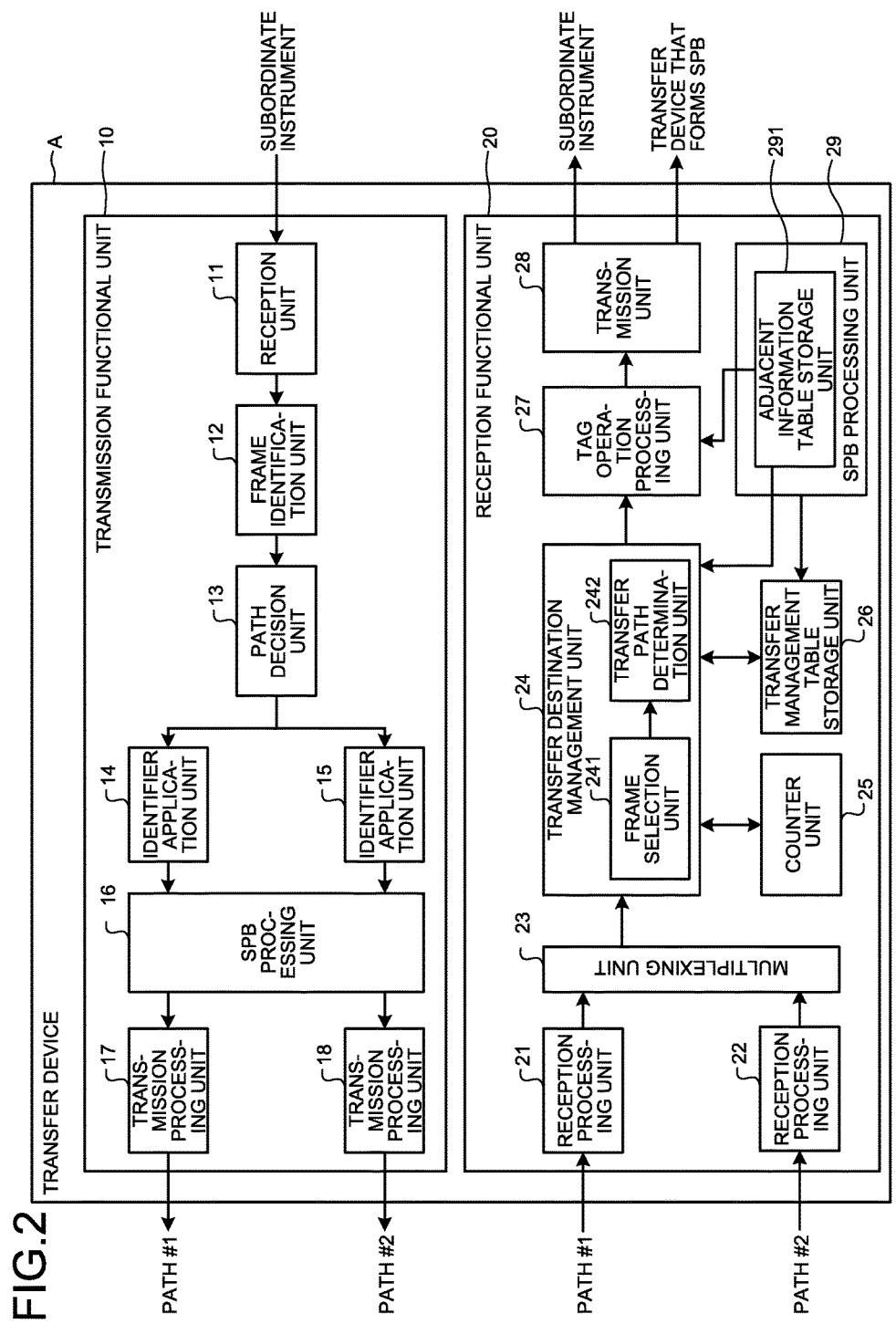
FIG. 2 is a block diagram illustrating a configuration example of a transfer device according to the first embodiment.

FIG. 2 is a block diagram illustrating a configuration example of a transfer device according to the first embodiment. Since the transfer devices A to D have the same configuration, an explanation will be given by use of the transfer device A. The transfer device A includes a transmission functional unit 10 that transmits frames received from a subordinate instrument to the paths #1 and #2, and a reception functional unit 20 that transmits frames received from the paths #1 and #2 to a subordinate instrument and a transfer device that forms SPB. The transfer device A transmits and receives frames to and from the paths #1 and #2 through ports included in its own device.

The transmission functional unit 10 includes: a reception unit 11 that receives frames from a subordinate instrument; a frame identification unit 12 that identifies an important frame, while it manages information for identifying an important frame, which is, for example, part of information in the frame header, such as a VID serving as the identification number of a virtual local area network, an Ether type number, and/or a transmission source address; and a path decision unit 13 that decides frame paths by copying an important frame onto two paths serving as destinations, and selecting one path from the two paths for a frame other than the important frames. Further, the transmission functional unit 10 includes: identifier application units 14 and 15 each of which applies identifiers to an important frame but applies no identifier to a frame other than the important frames; an SPB processing unit 16 that manages encapsulating information or the like necessary for SPB, such that it performs a frame encapsulation process when to make transfer to the port connected to a transfer device that forms SPB, and performs an encapsulation process when to make transfer to a subordinate instrument; a transmission processing unit 17 that transmits frames to the port connected to the path #1; and a transmission processing unit 18 that transmits frames to the port connected to the path #2.

The reception functional unit 20 includes: a reception processing unit 21 that receives frames from the port connected to the path #1, and performs thereto a process, such as error check; a reception processing unit 22 that receives frames from the port connected to the path #2, and performs thereto a process, such as error check; a multiplexing unit 23 that multiplexes frames received from a plurality of ports; a transfer destination management unit 24 including a frame selection unit 241 and a transfer path determination unit 242; a counter unit 25 that manages an order identifier, such as a sequence number serving as information about an already received frame; and a transfer management table storage unit 26 that stores a transfer management table for managing frame transfer destination port information, which indicates transfer destination ports for frames received from another transfer device. Further, the reception functional unit 20 includes: a tag operation processing unit 27 that performs a decapsulation process when to make transfer to the port connected to a subordinate instrument, but performs no decapsulation process when to make transfer to the port connected to a transfer device that forms SPB; a transmission unit 28 that transfers frames to the port connected to a subordinate instrument and the port connected to a transfer device that forms SPB; and an SPB processing unit 29 including an adjacent information table storage unit 291 that stores an adjacent information table, which indicates information about instruments connected to the ports, as to whether an adjacent device managed by SPB is a subordinate instrument under its own device, and specifically manages information as to whether it is a transfer device that forms SPB.

In the transfer destination management unit 24, the frame selection unit 241 operates, with respect to received frames, to identify an important frame from the received frames. This is done, based on important-frame information serving as information for identifying an important frame, which is, for example, part of information in the frame header, such as a VID, Ether type number, transmission source address, and/or SPB encapsulating information. With respect to each of the received frames, the frame selection unit 241 makes reference to, for example, a VID, which is the identification number of a virtual local area network, applied into the frame by the frame transmission source transfer device. Consequently, the frame selection unit 241 identifies an important frame, in accordance with VID information corresponding to the important frame and VID information corresponding to the ordinary frame, prescribed in the network system. Here, the frame selection unit 241 may operate, with reference to, for example, the VID of a received frame, such that it discriminates the importance of the frame in accordance with information about the importance of VIDs prescribed in the network system, and thereby identifies a frame with an applied VID having importance not lower than a threshold, as an important frame. Further, with respect to important frames received from independent paths, the frame selection unit 241 compares the order identifier values of the plurality of received important frames with the order identifier value of an already received important frame recorded in the counter unit 25. If the order identifier value of a received frame is not higher than the order identifier value recorded in the counter unit 25, the frame selection unit 241 determines that the received frame is an already received frame. If the order identifier value of a received frame is higher than the order identifier value recorded in the counter unit 25, the frame selection unit 241 determines that the received frame is a not-yet received frame. With respect to ordinary frames, the frame selection unit 241 does not compare them with the order identifier.

Further, in the transfer destination management unit 24, the transfer path determination unit 242 controls transfer of an important frame received from another transfer device by use of the transfer management table and the adjacent information table. The transfer path determination unit 242 operates based on the results obtained by the frame selection unit 241, i.e., an identification result as to whether a received frame is an important frame, and a determination result as to whether the important frame thus identified is a not-yet received frame or already received frame. If the important frame is a not-yet received frame, the transfer path determination unit 242 transfers it to a transfer destination designated by the transfer management table. On the other hand, if the important frame is an already received frame, i.e., if an important frame having the same data as an important frame already received is received from another transfer device, the transfer path determination unit 242 obtains information about the transfer destination ports from the transfer management table, and further obtains information about the instruments connected to the transfer destination ports from the adjacent information table. Then, the transfer path determination unit 242 transfers the important frame having the same data from the port connected to a "transfer device that forms SPB", but does not transfer it from the port connected to a subordinate instrument under its own device.

Here, an explanation will be given of the configurations of the transfer management table and the adjacent information table.

FIG. 3 is a view illustrating a configuration example of the transfer management table according to the first embodiment. The transfer management table stored in the transfer management table storage unit 26 is composed of hash values each determined from an SPB management VID and a destination address, and transfer destination port information about respective ports. The transfer path determination unit 242 of the transfer destination management unit 24 determines transfer at each port in accordance with transfer destination port information corresponding to a hash value that is calculated by an arithmetic operation of a hash function using the VID and destination address of a target frame as input values. Here, in the transfer destination port information illustrated in FIG. 3, "1" denotes transfer to be made, and "0" denotes transfer not to be made. For example, when the hash value is "2", it shows that the port 1 is with "1", the port 2 is with "1", - - - , and the port N is with "0".

FIG. 4 is a view illustrating a configuration example of the adjacent information table according to the first embodiment. The adjacent information table stored in the adjacent information table storage unit 291 shows connection destination information, which is information about devices respectively connected to the ports. For example, it shows that the port 1 is connected to a "transfer device that forms SPB", and the port 2 is connected to a "subordinate instrument".

Next, an explanation will be given of an operation of the transmission functional unit 10 and the reception functional unit 20 of each of the transfer devices A to D.

In the transmission functional unit 10, when the reception unit 11 receives a frame from the instrument 1, the frame identification unit 12, where important-frame information has been preset, makes reference to part of the frame header, such as a VID, Ether type number, and/or source address, and thereby identifies the frame as to whether it is an important frame. If the frame is an important frame and the instruments 2 and 3 are transfer destinations, the path decision unit 13 copies this frame and designates the paths #1 and #2 made redundant as transmission paths. Each of the identifier application units 14 and 15 applies identifier for determining order information or the like to the copied frame. The SPB processing unit 16 performs an encapsulation process by use of encapsulating information for each of the path #1 and the path #2, in accordance with an encapsulating process prescribed in IEEE802.1ad and IEEE802.1ah, and makes an output via each of the transmission processing units 17 and 18. If the frame is a frame other than important frames, the path decision unit 13 designates the transfer destination such that it is a port decided by use of output load distribution onto the redundant paths, such as a port whose path has a lower load. The load distribution method is not limited specifically.

In the reception functional unit 20, the multiplexing unit 23 multiplexes frames received via the reception processing units 21 and 22. The frame selection unit 241 of the transfer destination management unit 24 performs identification as to whether there is an important frame, and further performs determination as to whether the frame is a not-yet received frame or already received frame, by use of the counter unit 2. If the frame is a not-yet received frame or a frame other than the important frames, the transfer path determination unit 242 of the transfer destination management unit 24 decides a transfer destination port, which is designated by the transfer management table of the transfer management table storage unit 26, and performs transfer via the tag operation processing unit 27 and the transmission unit 28. On the other hand, if the frame is an already received important frame, the transfer path determination unit 242 of the transfer destination management unit 24 operates such that: of the transfer destinations designated by the transfer management table, it performs transfer to a port whose connection destination information shows "transfer device that forms SPB" in the adjacent information table of the adjacent information table storage unit 291; but does not perform transfer to the other ports. Here, the transfer path determination unit 242 of the transfer destination management unit 24 discards a frame having no transfer destination.

Figure 5:
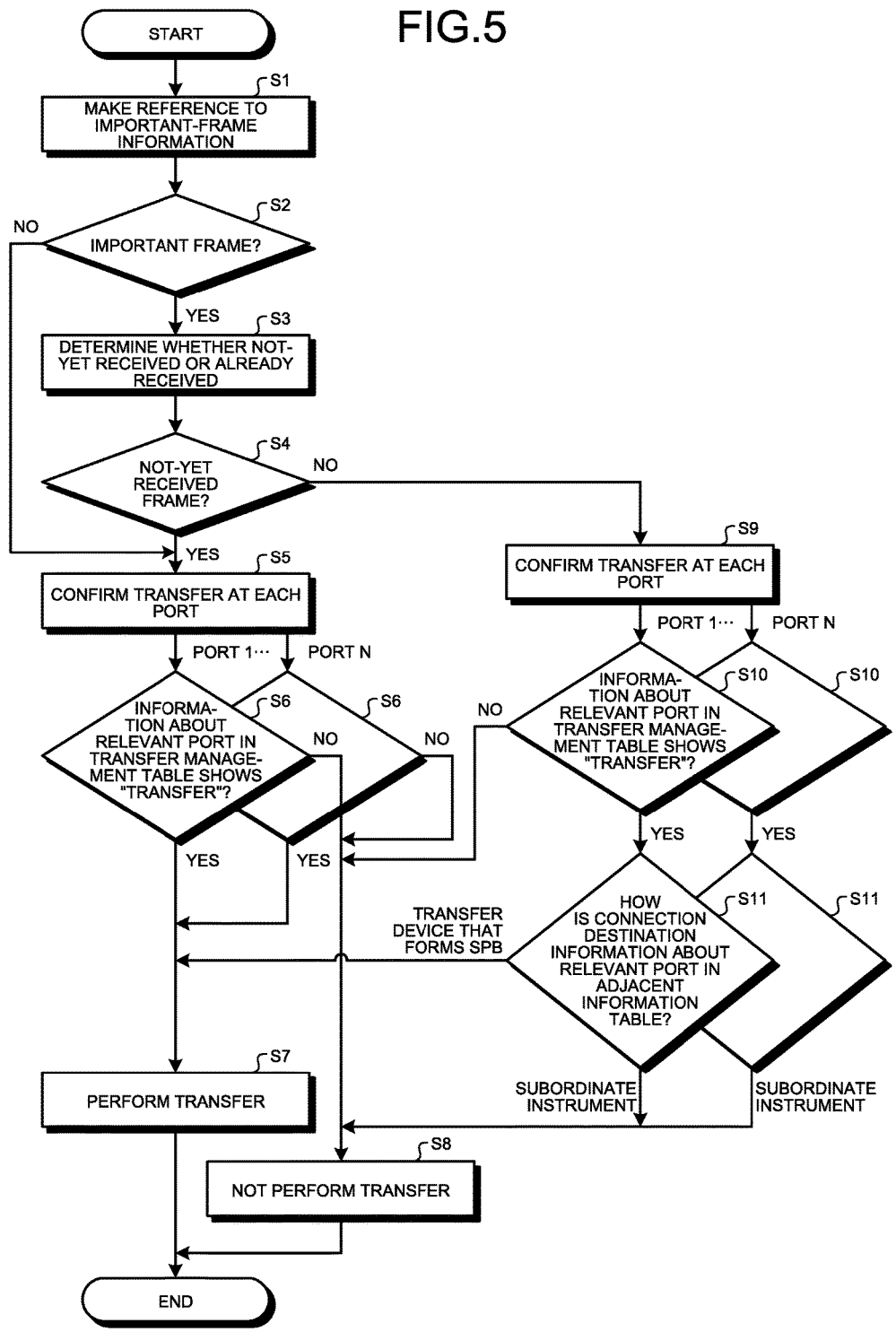
FIG. 5 is a flowchart illustrating an example of a transfer path determination process in a transfer destination management unit according to the first embodiment.

FIG. 5 is a flowchart illustrating an example of a transfer path determination process in the transfer destination management unit 24 according to the first embodiment. At first, in the transfer destination management unit 24, with respect to a received frame, the frame selection unit 241 makes reference to the important-frame information in the frame (step S1), and identifies the frame as to whether it is an important frame (step S2). If the frame is not an important frame (step S2: No), the flow skips the processes of steps S3 and S4, and proceeds to the process of a step S5 to be performed by the transfer path determination unit 242.

If the frame is an important frame (step S2: Yes), the frame selection unit 241 compares the order identifier applied to the frame with the order identifier recorded in the counter unit 25, and thereby determines whether the received frame is a not-yet received frame or already received frame (step S3). When the order identifier value of the received frame is not higher than the order identifier value recorded in the counter unit 25, the frame selection unit 241 determines that the received frame is an already received frame. When the order identifier value of the received frame is higher than the order identifier value recorded in the counter unit 25, the frame selection unit 241 determines that the received frame is a not-yet received frame.

If the received frame is a not-yet received frame (step S4: Yes), the frame selection unit 241 renews the order identifier recorded in the counter unit 25 by use of the order identifier of the received frame, and the flow proceeds to the process of the step S5 to be performed by the transfer path determination unit 242. If the received frame is an already received frame (step S4: No), the flow proceeds to the process of a step S9 to be performed by the transfer path determination unit 242.

If the frame is not an important frame (step S2: No), or if the frame is an important frame and is a not-yet received frame (step S4: Yes), the transfer path determination unit 242 makes reference to the transfer management table stored in the transfer management table storage unit 26, and confirms transfer at each port with respect to the received frame (step S5), by use of transfer destination port information designated by a hash value, which is determined from an SPB management VID and a destination address in the example illustrated in FIG. 3. With respect to each port, if information about the relevant port in the transfer management table shows "transfer", which is "1" in the example illustrated in FIG. 3, (step S6: Yes), the transfer path determination unit 242 decides to transfer the frame from this port designated in the transfer management table (step S7). On the other hand, with respect to each port, if information about the relevant port in the transfer management table shows "not transfer", which is "0" in the example illustrated in FIG. 3, (step S6: No), the transfer path determination unit 242 decides not to transfer the frame (step S8).

If the frame is an important frame and is an already received frame (step S4: No), the transfer path determination unit 242 makes reference to the transfer management table stored in the transfer management table storage unit 26, and confirms transfer at each port with respect to the received frame (step S9), by use of transfer destination port information designated by a hash value, which is determined from an SPB management VID and a destination address in the example illustrated in FIG. 3. With respect to each port, if information about the relevant port in the transfer management table shows "not transfer", which is "0" in the example illustrated in FIG. 3, (step S10: No), the transfer path determination unit 242 decides not to transfer the frame (step S8). On the other hand, with respect to each port, if information about the relevant port in the transfer management table shows "transfer", which is "1" in the example illustrated in FIG. 3, (step S10: Yes), the transfer path determination unit 242 further makes reference to the adjacent information table stored in the adjacent information table storage unit 291, and confirms the connection destination information (step S11), about the port corresponding to "transfer" in the transfer management table.

If the connection destination information about the relevant port in the adjacent information table shows "transfer device that forms SPB" (step S11: transfer device that forms SPB), the transfer path determination unit 242 decides to transfer the frame from the port designated by the transfer management table (step S7). On the other hand, if the connection destination information about the relevant port in the adjacent information table shows "subordinate instrument" (step S11: subordinate instrument), the transfer path determination unit 242 decides not to transfer the frame (step S8).

Here, as regards the process of the step S10 illustrated in the flowchart of FIG. 5, the process about a port other than the port 1 is not shown with a case of "No", for the sake of drawing design, but the process about another port is supposed to also have an arrow to the step S8 as in the port 1. Similarly, as regards the process of the step S11 illustrated in the flowchart of FIG. 5, the process about a port other than the port 1 is not shown with a case of "transfer device that forms SPB", for the sake of drawing design, but the process about another port is supposed to also have an arrow to the step S7 as in the port 1.

Figure 6:
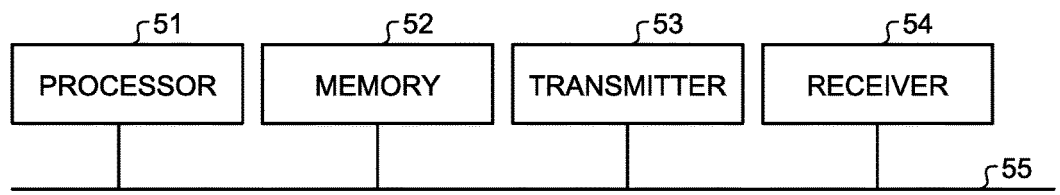
FIG. 6 is a view illustrating a hardware configuration example of a transfer device according to the first embodiment.

Next, an explanation will be given of a hardware configuration that realizes the configuration of each of the transfer devices A to D illustrated in the block diagram of FIG. 2. FIG. 6 is a view illustrating a hardware configuration example of each of the transfer devices A to D according to the first embodiment. Each of the frame identification unit 12, the path decision unit 13, the identifier application units 14 and 15, the SPB processing unit 16, the multiplexing unit 23, the frame selection unit 241 and transfer path determination unit 242 of the transfer destination management unit 24, the counter unit 25, and the tag operation processing unit 27 is achieved by a processor 51 that executes a program for each of their configurations stored in a memory 52. Each of the reception unit 11 and the reception processing units 21 and 22 is achieved by a receiver 54. Each of the transmission processing units 17 and 18 and the transmission unit 28 is achieved by a transmitter 53. Each of the transfer management table storage unit 26 and the adjacent information table storage unit 291 is achieved by the memory 52. The SPB processing unit 29 is achieved by the memory 52 together with the processor 51 that executes a program for the SPB processing unit 29 stored in the memory 52. The processor 51, the memory 52, the transmitter 53, and the receiver 54 are connected to each other by a system bus 55. In each of the transfer devices A to D, a plurality of processors 51 and a plurality of memories 52 may be arranged to operate in cooperation with each other to perform the function of each of the components illustrated in the block diagram of FIG. 2. Each of the transfer devices A to D can be achieved by use of the hardware configuration illustrated in FIG. 6, but some of the components may be implemented by use of either of software or hardware. Further, also the components of the transfer devices A to D that will be described in the following second embodiment may be similarly achieved by use of the hardware configuration illustrated in FIG. 6.

As descried above, according to this embodiment, each transfer device identifies a received frame as to whether it is an important frame. If the frame is an important frame, the transfer device determines whether the frame is a not-yet received frame or already received frame. If the frame is an already received frame, the transfer device decides transfer of the important frame by use of the transfer management table and the adjacent information table. Thus, in a network system, when a transfer device that forms SPB receives a frame, this transfer device can control frame transfer in accordance with whether the transfer destination is another transfer device that forms SPB or a subordinate instrument. Consequently, when the transfer destination is a subordinate instrument, it is possible to avoid unnecessary frame transfer.

Second Embodiment

In this embodiment, an explanation will be given of a method used in a case where the instrument 1 periodically transmits important frames to the instruments 2 and 3. In this method, the transmission side transfer device does not apply an order identifier to each important frame, but copies the important frame and transfers it to a plurality of paths. The reception side transfer device determines whether each important frame is a not-yet received frame or already received frame by use of a reception determination counter unit.

Figure 7:
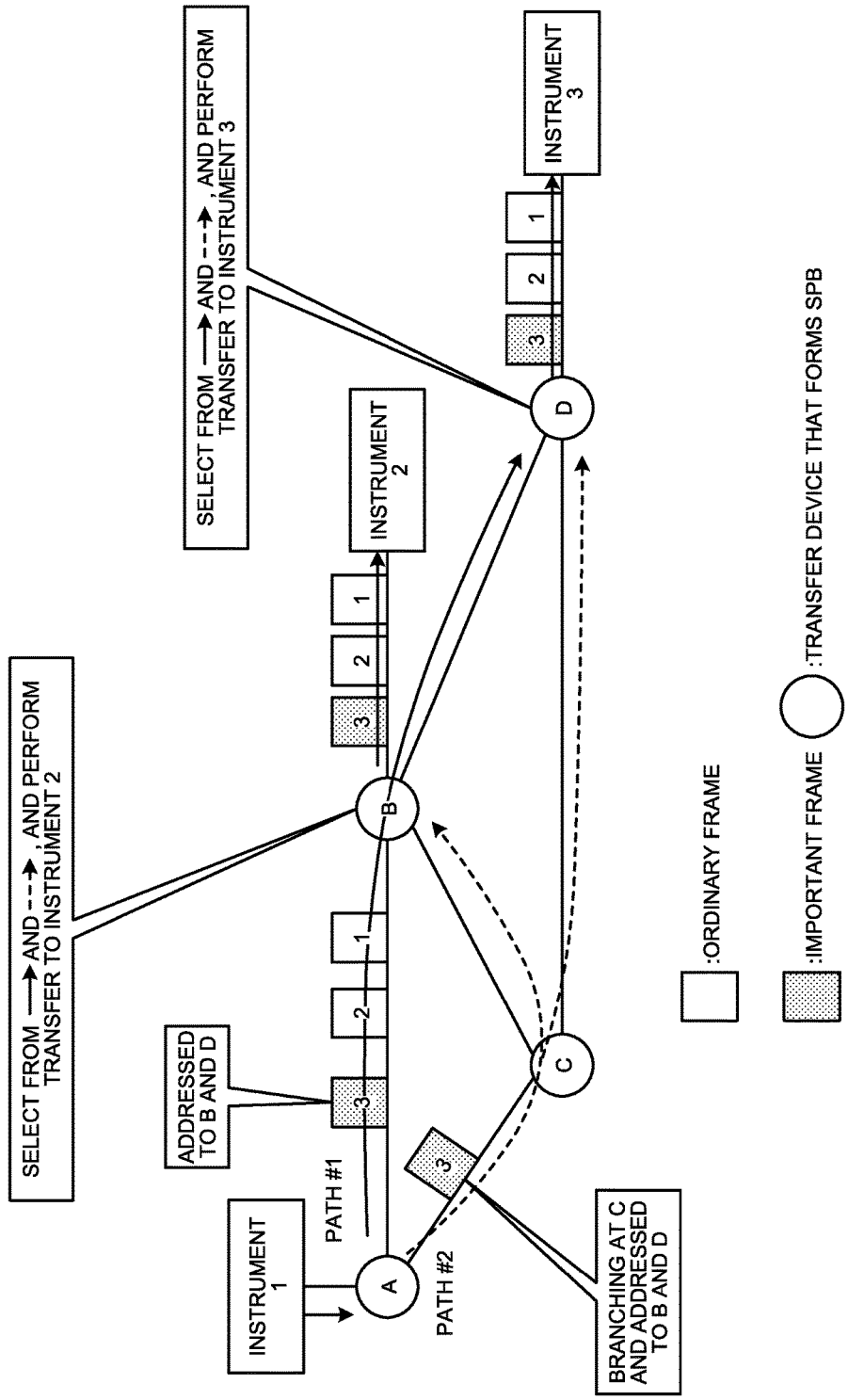
FIG. 7 is a view illustrating a configuration example of a network system according to a second embodiment.

FIG. 7 is a view illustrating a configuration example of a network system according to the second embodiment of the present invention. The network system is similar to that of the first embodiment illustrated in FIG. 1, but, as described above, the transfer device A transmits an important frame to the paths #1 and #2, without applying an order identifier thereto.

Figure 8:
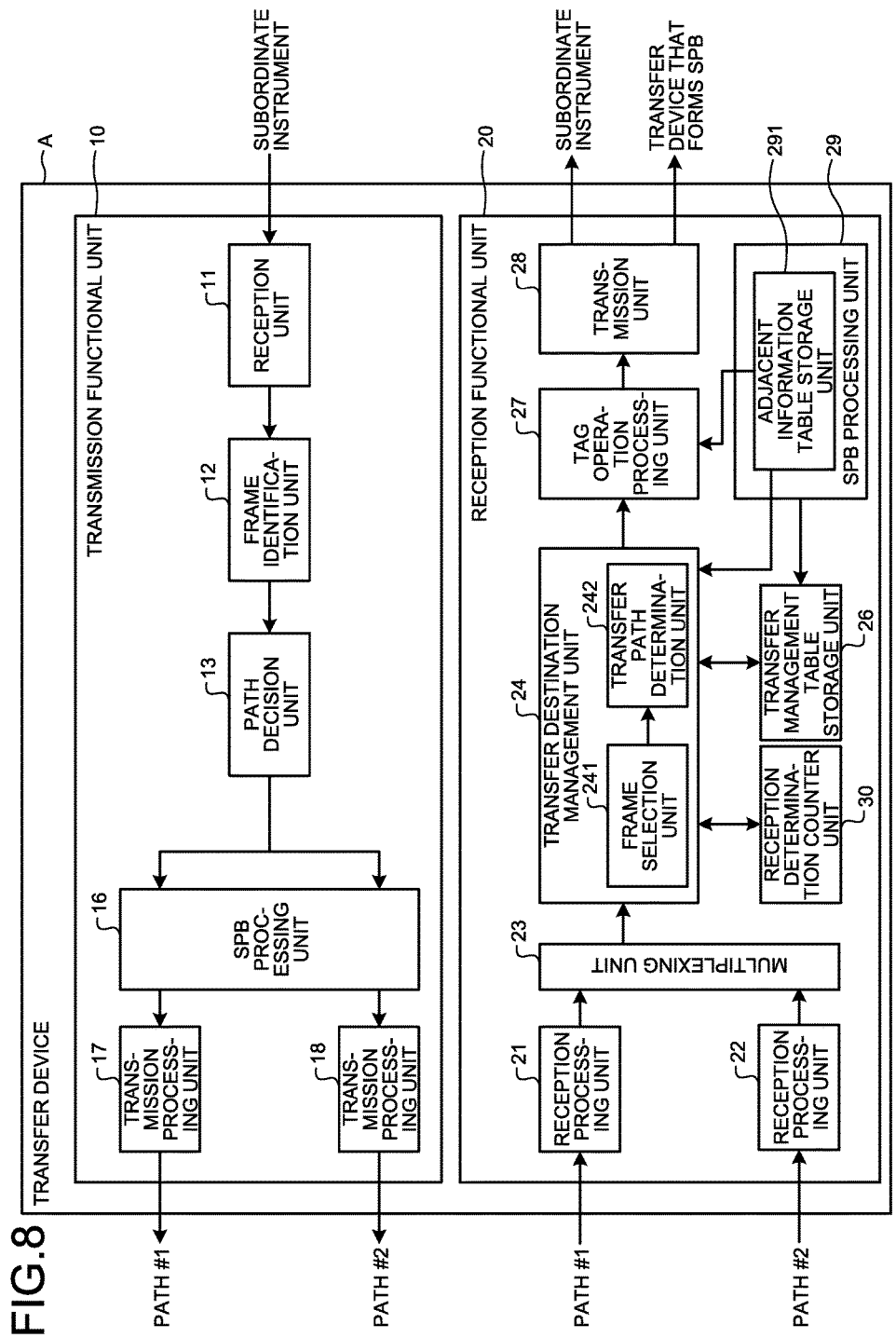
FIG. 8 is a block diagram illustrating a configuration example of a transfer device according to the second embodiment.

FIG. 8 is a block diagram illustrating a configuration example of a transfer device according to the second embodiment. Since the transfer devices A to D have the same configuration, an explanation will be given by use of the transfer device A. The transfer device A differs from that of the first embodiment illustrated in FIG. 2, such that the transmission functional unit 10 excludes the identifier application units 14 and 15, and that the reception functional unit 20 excludes the counter unit 25, but additionally includes a reception determination counter unit 30.

The reception determination counter unit 30 serves as a timer for determining the same frame, which expires with a time set on the premise that the difference between reception time points of an important frame to be received from a plurality of paths is not more than one half of the transmission period of important frames. With reference to the time point of the last reception of an important frame, if the time point of the next reception of an important frame comes before the expiration of the timer of the reception determination counter unit 30, the frame selection unit 241 determines that the latter important frame is an already received frame. If the time point of the next reception of an important frame comes after the expiration of the timer of the reception determination counter unit 30, the frame selection unit 241 determines that the latter important frame is a not-yet received frame.

Upon receiving a frame high in importance, the frame selection unit 241 of the transfer destination management unit 24 operates the timer of the reception determination counter unit 30, which has set with an expiration time based on the transmission period of important frames, and determines that an important frame received before the timer expiration time is an already received frame, and an important frame received after the timer expiration time is a not-yet received frame.

Next, an explanation will be given of an operation of the transmission functional unit 10 and the reception functional unit 20 of each of the transfer devices A to D.

In the transmission functional unit 10, when the reception unit 11 receives a frame from the instrument 1, the frame identification unit 12, which has been preset with periodic-important-frame information about important frames periodically transmitted and received in the network system, makes reference to part of the frame header, such as a VID, Ether type number, and/or source address, and thereby identifies the frame as to whether it is a periodic important frame. For example, in a case where the periodic-important-frame information described above is set by use of VIDs, the frame identification unit 12 makes reference to the VID of a received frame, and identifies the frames as a periodic important frame if this VID corresponds to a VID set in the periodic-important-frame information. When the frame is a periodic important frame and the instruments 2 and 3 are transfer destinations, the path decision unit 13 copies this frame and designates the paths #1 and #2 made redundant as transmission paths. The SPB processing unit 16 performs an encapsulation process by use of encapsulating information for each of the path #1 and the path #2, and makes an output via each of the transmission processing units 17 and 18. If the frame is a frame other than important frames, the path decision unit 13 designates the transfer destination such that it is a port decided by use of output load distribution onto the redundant paths. The load distribution method is not limited specifically.

In the reception functional unit 20, the multiplexing unit 23 multiplexes frames received via the reception processing units 21 and 22. The frame selection unit 241 of the transfer destination management unit 24 performs identification as to whether there is a periodic important frame, and further performs determination as to whether the frame is a not-yet received frame or already received frame, by use of the reception determination counter unit 30. If the frame is a not-yet received frame or a frame other than the periodic important frames, the transfer path determination unit 242 of the transfer destination management unit 24 decides a transfer destination port, which is designated by the transfer management table of the transfer management table storage unit 26, and performs transfer via the tag operation processing unit 27 and the transmission unit 28. On the other hand, if the frame is an already received periodic important frame, the transfer path determination unit 242 of the transfer destination management unit 24 operates such that: of the transfer destinations designated by the transfer management table, it performs transfer to a port whose connection destination information shows "transfer device that forms SPB" in the adjacent information table of the adjacent information table storage unit 291; but does not perform transfer to the other ports. Here, the transfer path determination unit 242 of the transfer destination management unit 24 discards a frame having no transfer destination.

The transfer path determination process in the transfer destination management unit 24 according to the second embodiment is the same as that of the flowchart illustrated in FIG. 5 according to the first embodiment. In this respect, the second embodiment differs from the first embodiment only in the process of the step S3 in which the frame selection unit 241 determines whether a received frame is a not-yet received frame or already received frame.

FIG. 9 is a view illustrating a process example for determining whether a frame received by the frame selection unit 241 is a not-yet received frame or already received frame, according to the second embodiment.

At first, when the frame selection unit 241 receives the first important frame from the path #1, it determines that the received first important frame is a not-yet received frame, because the timer of the reception determination counter unit 30 is not in operation. The frame selection unit 241 starts the operation of the timer of the reception determination counter unit 30. When frame selection unit 241 receives the first important frame from the path #2, it determines that the received first important frame is an already received frame, because the timer of the reception determination counter unit 30 is in operation and is within the "already received" zone set before the timer expiration. At the timer expiration, the reception determination counter unit 30 stops the operation of the timer.

Then, when the frame selection unit 241 receives the second important frame from the path #2, it determines that the received second important frame is a not-yet received frame, because the timer of the reception determination counter unit 30 is not in operation. The frame selection unit 241 starts the operation of the timer of the reception determination counter unit 30. When frame selection unit 241 receives the second important frame from the path #1, it determines that the received second important frame is an already received frame, because the timer of the reception determination counter unit 30 is in operation and is within the "already received" zone set before the timer expiration. At the timer expiration, the reception determination counter unit 30 stops the operation of the timer.

Here, it is assumed that a failure has occurred in the path #1.

Then, when the frame selection unit 241 receives the third important frame from the path #2, it determines that the received third important frame is a not-yet received frame, because the timer of the reception determination counter unit 30 is not in operation. The frame selection unit 241 starts the operation of the timer of the reception determination counter unit 30. During the "already received" zone, there is no input of the third important frame from the path #1. At the timer expiration, the reception determination counter unit 30 stops the operation of the timer. Also for the fourth important frame and the fifth important frame, the frame selection unit 241 operates in the same way as that for the third important frame described above as long as the failure in the path #1 remains.

As described above, according to this embodiment, in a case where important frames are periodically transmitted, the transmission side transfer device does not apply an order identifier to each of the important frames periodically transmitted. However, the reception side transfer device uses a timer for determining the same frame, which expires with a time set in consideration of the maximum time difference between reception time points of an important frame to be received from a plurality of paths. Consequently, the reception side transfer device can determines whether each of the important frames periodically transmitted is a not-yet received frame or already received frame.

The configurations illustrated in the above embodiments are mere examples of the contents of the present invention, and they may be combined with other known techniques. Further, the configurations may be partly omitted or changed without departing from the spirit of the present invention.

REFERENCE SIGNS LIST

10 transmission functional unit, 11 reception unit, 12 frame identification unit, 13 path decision unit, 14, 15 identifier application unit, 16 SPB processing unit, 17, 18 transmission processing unit, 20 reception functional unit, 21, 22 reception processing unit, 23 multiplexing unit, 24 transfer destination management unit, counter unit, 26 transfer management table storage unit, 27 tag operation processing unit, 28 transmission unit, 29 SPB processing unit, 30 reception determination counter unit, 241 frame selection unit, 242 transfer path determination unit, 291 adjacent information table storage unit, A, B, C, D transfer device.

The invention claimed is:

1. A transfer device comprising:
   a transfer management table storage unit to store a transfer management table which indicates transfer destination ports for frames received from another transfer device, the another transfer device being configured to transmit a frame low in importance of received frames without copying this frame and to transmit an important frame of received frames to paths made redundant by copying the important frame, the important frame being a frame higher in importance than the frame low in importance;
   an adjacent information table storage unit to store an adjacent information table which indicates information about instruments connected to the ports; and
   a transfer destination management unit to control whether to transfer an important frame received from another transfer device by use of the transfer management table and the adjacent information table.

2. The transfer device according to claim 1, wherein, when the transfer destination management unit receives from another transfer device an important frame having a same data as an important frame already received, the transfer destination management unit obtains information about transfer destination ports from the transfer management table, and further obtains information about instruments connected to transfer destination ports from the adjacent information table, whereby the transfer destination management unit transfers the important frame having a same data from a port connected to a transfer device, and does not transfer this important frame from a port connected to a subordinate instrument under its own device.

3. The transfer device according to claim 2, wherein, in a case where the important frame is a frame that is periodically transmitted, when the transfer destination management unit receives the important frame, the transfer destination management unit operates timer with an expiration time set based on a transmission period of the important frames, and the transfer destination management unit determines that an important frame received before the expiration time of the timer is an already received frame, and determines that an important frame received after the expiration time of the timer is a not-yet received frame and therefore operates the timer.

4. The transfer device according to claim 1, wherein the transfer destination management unit identifies importance of a frame by use of an identification number of a virtual local area network applied into the frame by a transfer device of a frame transmission source.

5. The transfer device according to claim 4, wherein, in a case where the important frame is a frame that is periodically transmitted, when the transfer destination management unit receives the important frame, the transfer destination management unit operates timer with an expiration time set based on a transmission period of the important frames, and the transfer destination management unit determines that an important frame received before the expiration time of the timer is an already received frame, and determines that an important frame received after the expiration time of the timer is a not-yet received frame and therefore operates the timer.

* * * * *